United States Patent [19]
Crawford et al.

[11] Patent Number: 5,901,033
[45] Date of Patent: May 4, 1999

[54] MULTISIDED COMMUNICATION DISTRIBUTION CABINET

[75] Inventors: William A. Crawford, Lakewood; David J. Michlovic, Avon Lake, both of Ohio

[73] Assignee: Reltec Corporation, Lorain, Ohio

[21] Appl. No.: 08/854,894

[22] Filed: May 13, 1997

[51] Int. Cl.[6] .................................................. H02B 1/00
[52] U.S. Cl. .................... 361/600; 361/601; 361/614; 361/622; 361/633; 174/65 R; 174/51; 174/52.1
[58] Field of Search .................... 361/600, 601, 361/622, 631, 634, 627, 628; 174/65 R, 58, 51, 52.1; 439/92, 638

[56] References Cited

U.S. PATENT DOCUMENTS

| | | |
|---|---|---|
| 3,708,725 | 1/1973 | Burton et al. . |
| 4,121,276 | 10/1978 | Kovatch et al. . |
| 4,307,304 | 12/1981 | Kovatch et al. . |
| 4,621,303 | 11/1986 | Rowe . |
| 5,001,602 | 3/1991 | Suffi et al. ............................. 361/724 |
| 5,070,429 | 12/1991 | Skirpan . |
| 5,202,538 | 4/1993 | Skirpan . |
| 5,212,623 | 5/1993 | Wilson et al. . |
| 5,295,041 | 3/1994 | Metivier et al. . |
| 5,548,489 | 8/1996 | Reed et al. ............................. 361/827 |

*Primary Examiner*—Leo P. Picard
*Assistant Examiner*—Boris L. Chervinsky
*Attorney, Agent, or Firm*—Fay, Sharpe, Beall, Fagan, Minnich & McKee

[57] ABSTRACT

An equipment/distribution cabinet which contains electrical/electronic device modules. The cabinet allows for front, side and rear access for replacement, servicing and maintenance of the modules carried by the cabinet. The cabinet further includes mounting units which creates areas within which the modules are mounted within the cabinet. The mounting units connect to corner supports assisting in the front, side and rear access. The mounting units further include integrated wire and cable passage ways and tie bars allowing for organization of the wiring within the cabinet. The cabinet is produced to allow either top or bottom access and can accept a plurality of input voltage levels. The cabinet is constructed so that modules having a variety of different functional characteristics and sizes may be intermixed.

20 Claims, 17 Drawing Sheets

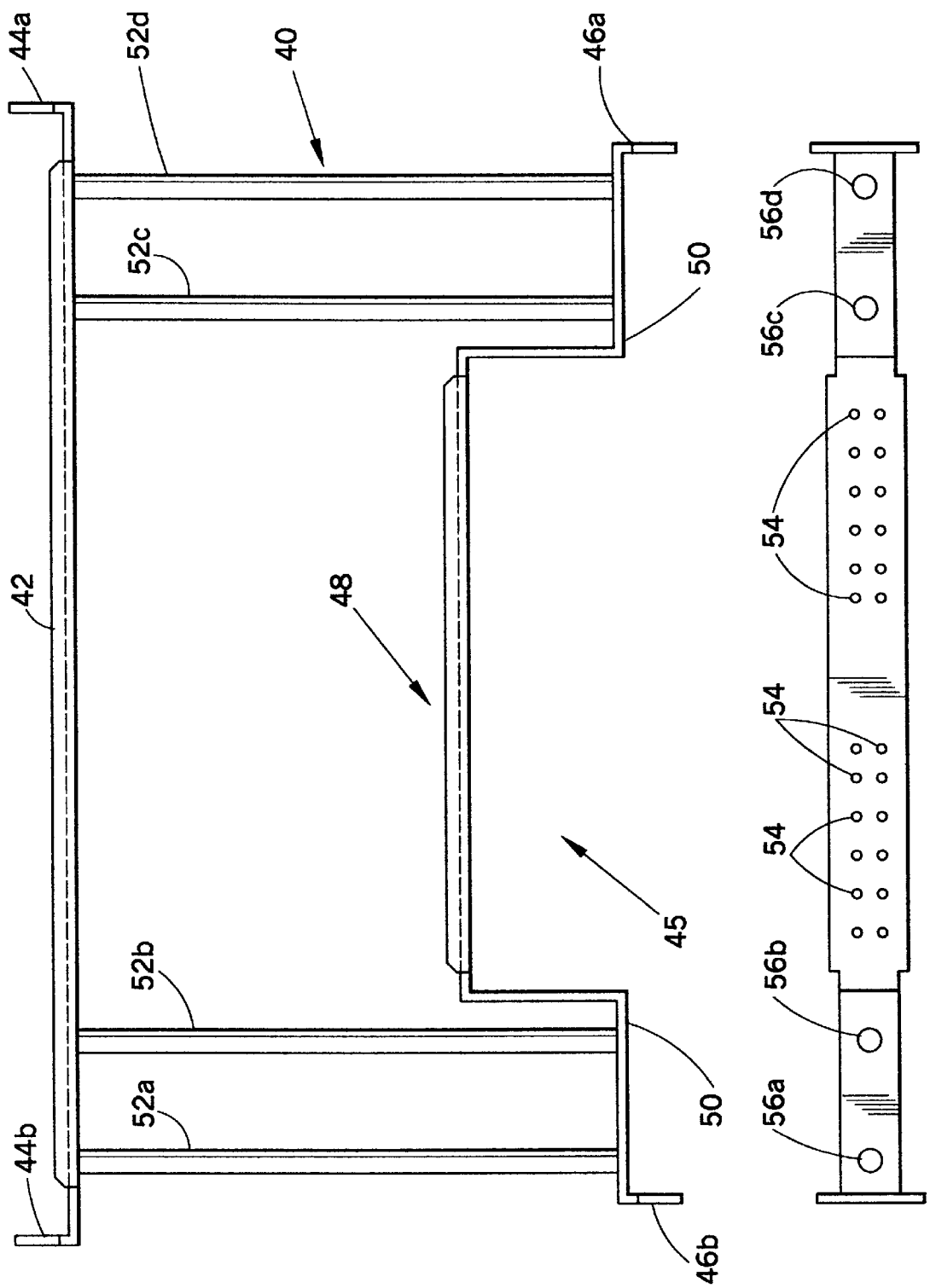

MULTISIDED COMMUNICATION DISTRIBUTION CABINET

BACKGROUND OF THE INVENTION

This invention pertains to the art of power distribution and in particular to a power distribution cabinet which carries electric/electronic devices. The invention finds particular application in connection with modularized power distribution systems in the communication industry. It will be appreciated, however, that the invention has broader applications and may be advantageously employed in other environments and applications which impose access and wiring constraints in modularized distribution systems.

Distribution cabinets are in wide spread use in a variety of industries. Within the communication industry a variety of cabinets having different characteristics are used. Some cabinets are constructed to have doors and locks on an outer surface such that access can be limited to appropriate personnel. Other cabinets include front panels which allow a visual inspection of the components operating within a cabinet while denying access to the devices.

Still further, cabinets such as the battery distribution cabinet 10 of FIG. 1 have been constructed to allow access to the front of a device in the cabinet but limits access to the interior. Distribution cabinet 10 has been constructed for branch loading systems that can be configured for ±24 volt, 48 volt or 130 volt power systems with up to 600 amp capacities. The cabinet of FIG. 1 is designed to accept fuse panels 12 and circuit breaker panels 14, and is a rear access cabinet designed to allow for either one of top or bottom feeding of external power cables. The construction of distribution cabinet 10, is reviewed in greater detail in connection with FIGS. 2–5b and the following discussion.

FIG. 2 is a side view of cabinet 10. As shown by this view, fuse panels 12 and circuit breaker panels 14 are inserted through a front cover panel 16 and thereafter connected to bus bars 18, including connections 18a. The connections to bus bars 18 allows for the distribution of power throughout the cabinet. As further illustrated in FIG. 2, when it is desired to access any one of fuse panels 12 or circuit breaker panels 14 it is not possible to gain such access through the front of cabinet 10. Rather, the appropriate manner to access the internal area of cabinet 10 is through removal of rear cover panel 20. Though not shown in detail in this figure, rear cover panel 20 is connected to the cabinet through a variety of interconnection devices such as screws, bolts, clips or other known removable connection devices.

Removal of rear cover panel 20 allows access to the interior of cabinet 10. This is more clearly shown in FIG. 3 which illustrates a rear view of cabinet 10 with rear cover panel 20 removed. At this point if it is necessary to remove one of fuse panel 12 or circuit breaker panel 14 a technician may disconnect the required wires, bolts, screws, clips, etc. holding the particular panel in position. When the connections in the rear of the panel are disconnected, the panel or individual fuses or circuit breaker can then be removed. In some cabinets it may also be necessary to remove connection devices in the front face of cabinet 10, such as screws 24 shown in FIG. 1.

It is also noted that internal connection between circuit breakers and/or fuses of fuse panels 12, and circuit breaker panels 14 are wired through internal wires 22, and the external power is distributed through the cabinet by power cables 23. It is to be noted that the cabinet of FIGS. 1–3 is a bottom feed, wherein external cabling carrying power to the cabinet provides the power through the bottom of the cabinet, not shown.

Various feeding arrangements are shown with more particularity in FIGS. 4a–4b and 5a–5b, as will be discussed below. The internal wires 22 and cables 23 may each be bundled together at convenient locations and tied to internal areas of the cabinet at tie areas, typically these areas tie are integral with side cover panels 21a, 21b, to maintain the wiring in a secure position and to allow for an orderly organization of complicated wiring interconnections. The tieing of the wires is accomplished at convenient locations within the cabinet structure itself.

Returning attention to FIG. 2, this figure illustrates that if someone was attempting to access the interior of cabinet 10 through front cover panel 16 it would be necessary to substantially disassemble the cabinet. Particularly, as detailed in FIG. 1, fuse panels 12, and circuit breaker panels 14 are secured to front cover panel 16 through a connection arrangement such as with screws or bolts 24. However, even if these bolts or screws are removed, as can be seen in FIG. 2, since bus bars 18 are connected to panels 12 and 14 it would not be possible to remove the panels through the front face of front cover panel 16 as bus bars 18 would block such removal. For example, it would not be possible for a technician to reach in through the front panel in order to gain access to a location where the bus bars 18 are connected to the elements of fuse panels 12, and circuit breaker panels 14.

Typically, in such a cabinet, fuse the panels 12, and circuit breaker panels 14 are interconnected to the front cover panel 16. Therefore, if one were to attempt to gain access to the interior of cabinet 10 through the front of the cabinet of FIGS. 1–3, it would be necessary to substantially disassemble the cabinet which could require shutting down the entire power system. Also, though not shown with particularity in this view, cabinets will also use mounting trays, to which the panels are either mounted to or held on. Such trays are typically connected directly to the front panel. These arrangements create an undesirable situation, as technicians wish to be able to remove either individual fuses, circuit breakers or the panels of circuit breakers and fuses, 12, 14 while the remainder of the equipment within cabinet 10 are active. This cannot be accomplished through the front panel 16 of cabinet 10. Therefore, the typical manner of gaining access to the interior of cabinet 10 is through removal of rear cover panel 20 which has no such impediments.

Applicants note that FIG. 2 may appear to imply that there is a side access capability for cabinet 10. Specifically, it might appear from this view that a technician is able to remove a side panel of cabinet 10 and gain access to the interior of cabinet 10, since the main inhibiting elements from such an access are only connection bars 19. However, it is noted that this view of FIG. 2 is prior to any wiring or cabling required within the cabinet. FIG. 3 shows such wiring 22 and cabling 23. As FIG. 3 illustrates, internal wires 22 are arranged in bundles and tied to tie points associated with side cover panel 21a. Similarly, cables 23 which run along a side of cabinet 10 are tied at a location integral to side panel 21b. Therefore, when the cabinet is constructed, it is typically not possible to simply remove the side panel, since the tie points are connected to the side panels. In order to remove the tie points, it would be necessary to enter the cabinet from the rear and detach the tie points. Thus, again, entry into the interior of the cabinet is accomplished by rear access.

It is also noted that in addition to fuse panels 12 and circuit breaker panels 14, cabinet 10 also includes a metering panel 25, which generates analog and/or digital read outs which provide information as to the internal status of the devices within the cabinet. It is to be appreciated the metering panel may also deliver such information through auditory signals.

FIGS. 4a–5b illustrate different power feed arrangements for cabinet 10. FIG. 4a details a single load top feed arrangement wherein external power connections 26 feed the load of cabinet 10, thereby supplying power to the various panels. FIG. 4b illustrates the powering of cabinet 10 with a single load bottom feed arrangement, wherein the load is fed with external cables through the bottom of the cabinet, and where the cabinet in this arrangement further includes ground return 27. FIG. 5a is a dual load top feed arrangement wherein loads A and B are fed through external cable connections. FIG. 5b shows a typical dual load with bottom feed arrangement having loads A and B fed by external cable connections 28a and 28b and further including ground load returns 29a and 29b, for loads A and B, respectively.

In large distribution cabinets, the internal wiring may have a high degree of complexity, with numerous individual interconnections. Therefore, for organizational purposes, when constructing the cabinets, tie-points are used so that wires in a certain areas are bundled together and tied to a post or other structure included within the cabinet. This tieing of wires maintains order in the cabinet, thereby assisting in the construction of the cabinet and also allowing a technician to identify interconnections with greater ease.

As previously noted, the above described cabinet is commonly known as a rear access cabinet. If it is desired by a user to remove a particular panel for repair, replacement, or to otherwise service the panel, it is necessary to remove the rear cover panel 20 as shown in FIGS. 2 and 3, which allows access to the interior of the cabinet.

In this type of cabinet, it is not possible, however, to effectively obtain access from the front or sides of the cabinet. Particularly, as previously discussed, in constructing the cabinet, the configuration of the cover panels, fuse/circuit breaker panels and bus bar configurations and internal wiring/cabling do not allow detaching of front cover panel 16 or side cover panels 21a, 21b to gain direct access to the interior through the front or sides of the cabinet.

As an alternative to rear access cabinets, front access cabinets have also been configured. In such cabinets the configuration allows removal of the front panel to gain access to the interior of the cabinet. Alternatively, the panels may be detached from the cabinet and pulled out or otherwise accessed through the front panel.

Therefore, in a front access cabinet the front panel can be removed to access the interior of the cabinet or the panel, i.e. device itself is removed. However, in this situation rear access is not available, since structures holding the panels (e.g. fuse or circuit breaker points) or other elements of the cabinet, such as the bus bars, mounting trays, etc. are connected to the back panel.

In existing distribution cabinets when wires are tied on a structure included within the cabinet, it is a requirement of various safety agencies to insulate the tie areas, when these tie areas have edges of a predetermined angle. Particularly, the concern is that sharp angled metal, which is commonly used in distribution cabinets, can cut the wires which are being tied thereto.

It is also typical in existing distribution cabinets that the fuse, circuit breaker or other device panels are not physically or electrically segregated. This type of arrangement means that only a power source of a single value is provided to a cabinet.

Due to the above construction, it is necessary that the servicing, replacement or inspection of the device panels occur only through either one of a front side in a front access cabinet or a rear side in a rear access cabinet. Thus, while existing cabinets may be either front access or rear access cabinets, a single cabinet which allows both front and rear access does not exist.

Also, existing cabinets do not provide predefined tie point positions to ensure consistent repetitive location of the tie points. Further, in cabinets where the tie-points have sharp edges, another step in the building process is needed for insulating the tie point, as well as the additional cost for the insulation.

Additionally, the device panels are not segregated physically or electrically from each other thereby requiring the input power to be of a single value and also requiring a limited amount of panels which may be fed from a same source.

Therefore, it has been deemed desirable to construct a cabinet which allows for front, rear and side access of modules being carried in distribution cabinet and for such a cabinet which has defined passages for inner-cabinet wiring/cabling.

It has also been determined desirable to provide tie point areas which are integrated into a mounting of unit such that construction of the cabinet is simplified, thereby increasing the efficiency of production. This also eliminates the need for insulating at the tie points.

It has also been deemed desirable to form a cabinet in a single unit having two sides, i.e. a front and back side each having power termination protection or current protection modules inserted therein.

Still further, the cabinet should be constructed to receive modules which allow for physical and electrical segregation from each other, thereby allowing dual power sourcing as well as increasing the number of elements which may be fed from a same source. The cabinet should also allow for the monitoring of current for each module.

SUMMARY OF THE INVENTION

The present invention contemplates a new and improved distribution cabinet configured to hold modularized electronic components. The cabinet allows for both front side and rear access to the modules.

According to a more limited aspect of the invention, tie point areas are integrated within a mounting unit in such a manner as to not require insulation at the tie point area and to allow a worker constructing such a unit to be provided with a tie point area at a consistent location.

According to yet another aspect of the present invention, the modules located within the unit may be physically and electrically segregated.

A principal advantage of the present invention is the provision of a distribution cabinet that meets both operative and dimensional constraints of selected uses and allows access to front side and back portions of the cabinet.

Another advantage of the present invention is the provision of predefined wire passages and integrated tie areas.

Yet another advantage of the present invention resides in an increase in the efficiency of construction.

Still another advantage of the present invention is a distribution cabinet having inserted in power termination and current protection modules each of a front face of the cabinet and a rear face of the cabinet.

Still yet other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 7 is a top view of a mounting unit used in the cabinet of the present invention;

FIG. 8 is a front view of the front portion of mounting unit of FIG. 7;

DETAILED DESCRIPTION OF THE PREFERRED EMBODIMENT

Figures 1, 2:
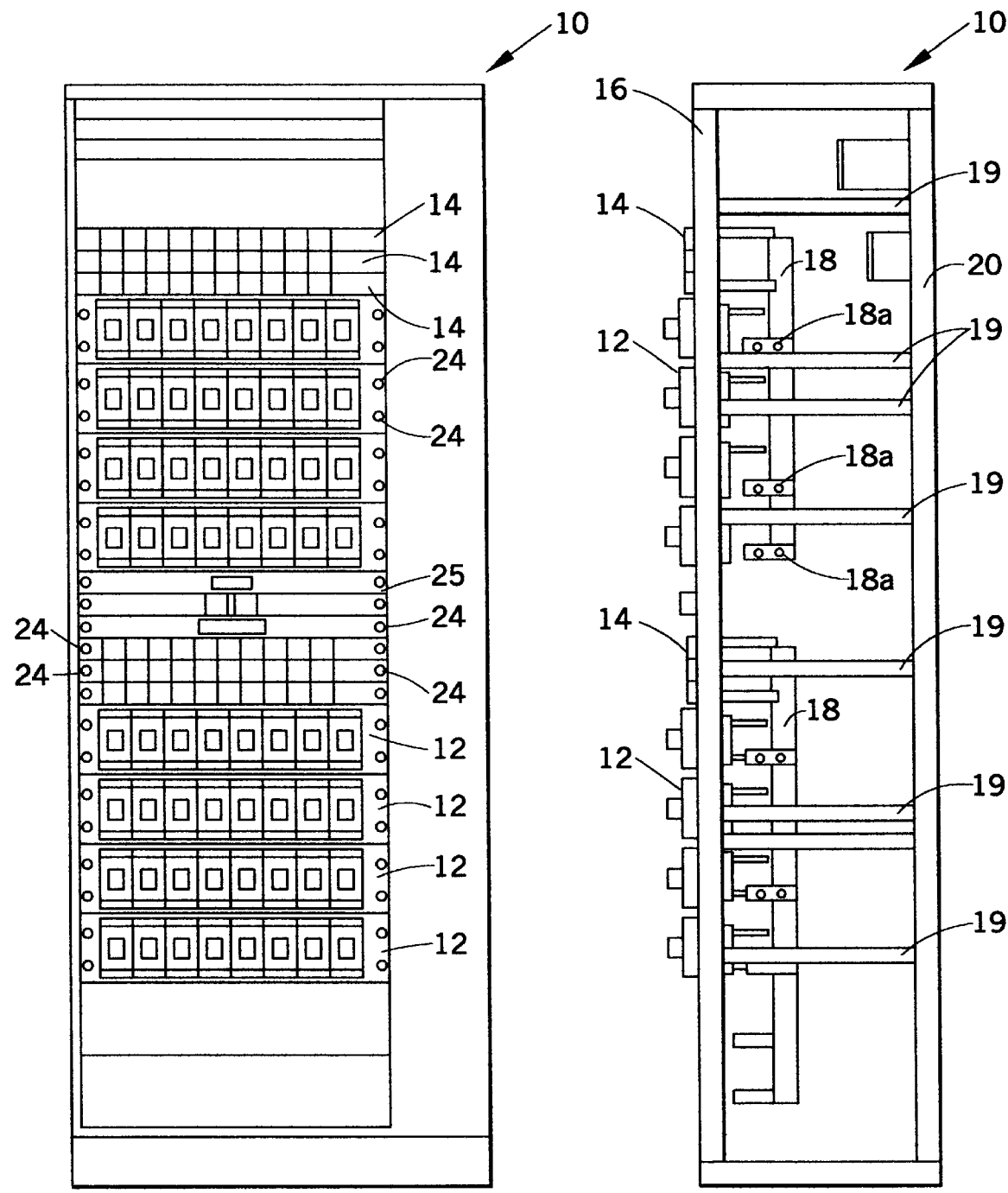
FIG. 1 is an example of a rear access distribution cabinet.
FIG. 2 illustrates a side view of the cabinet of FIG. 1.
Figure 3:
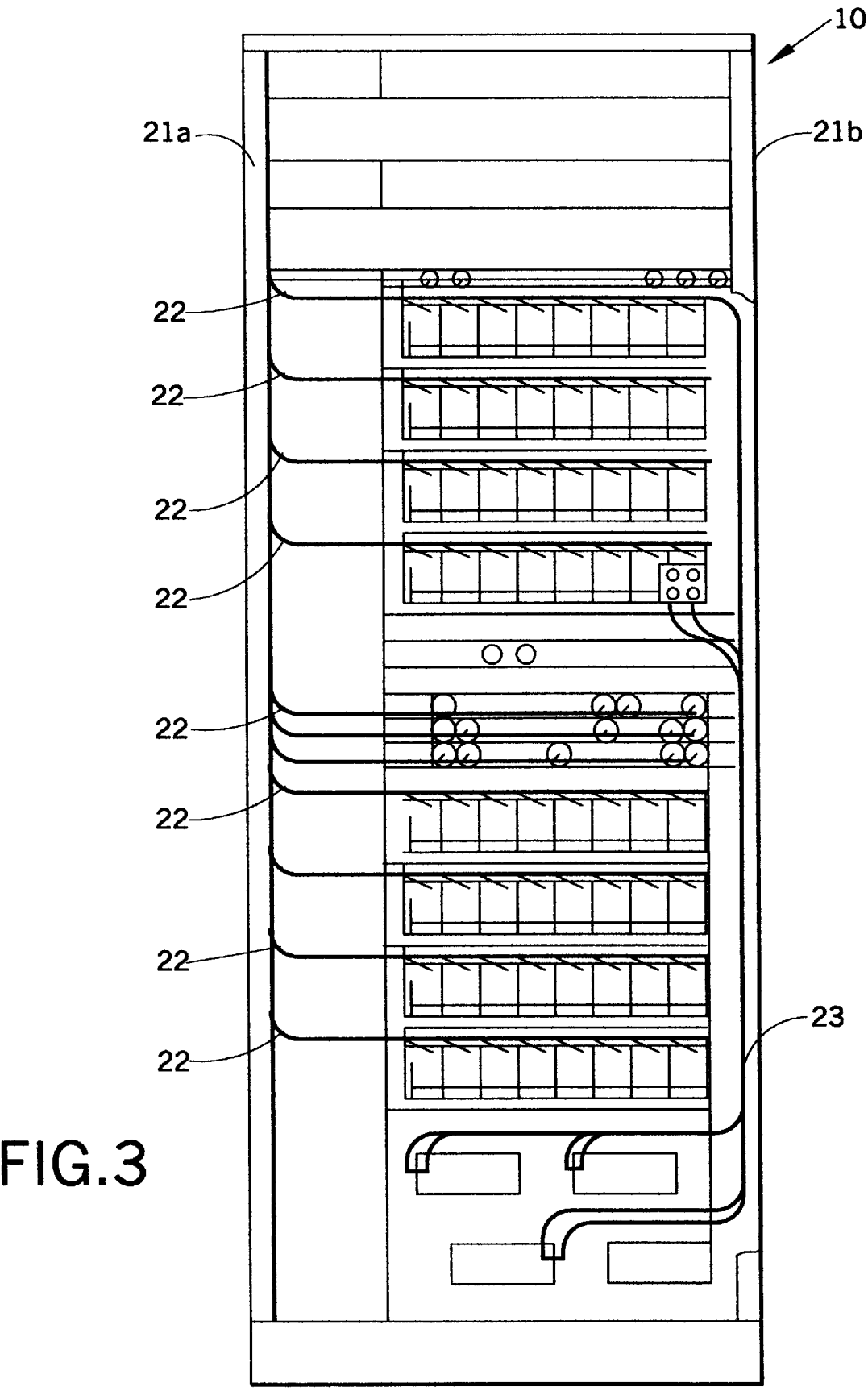
FIG. 3 shows a rear view of the cabinet of FIG. 1.
Figure 4A:
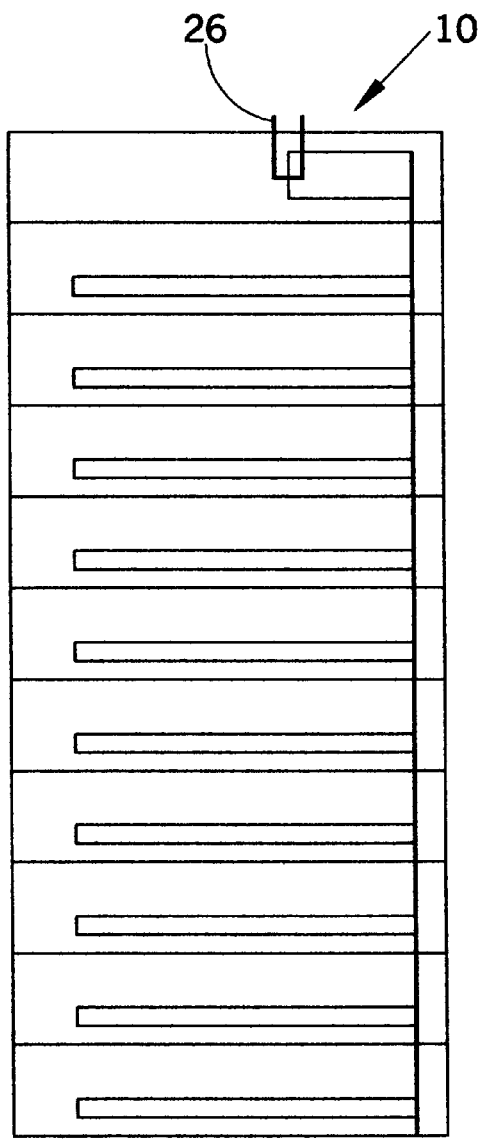
FIGS. 4a–4b illustrates top and bottom power feed for distribution cabinets.
Figure 4B:
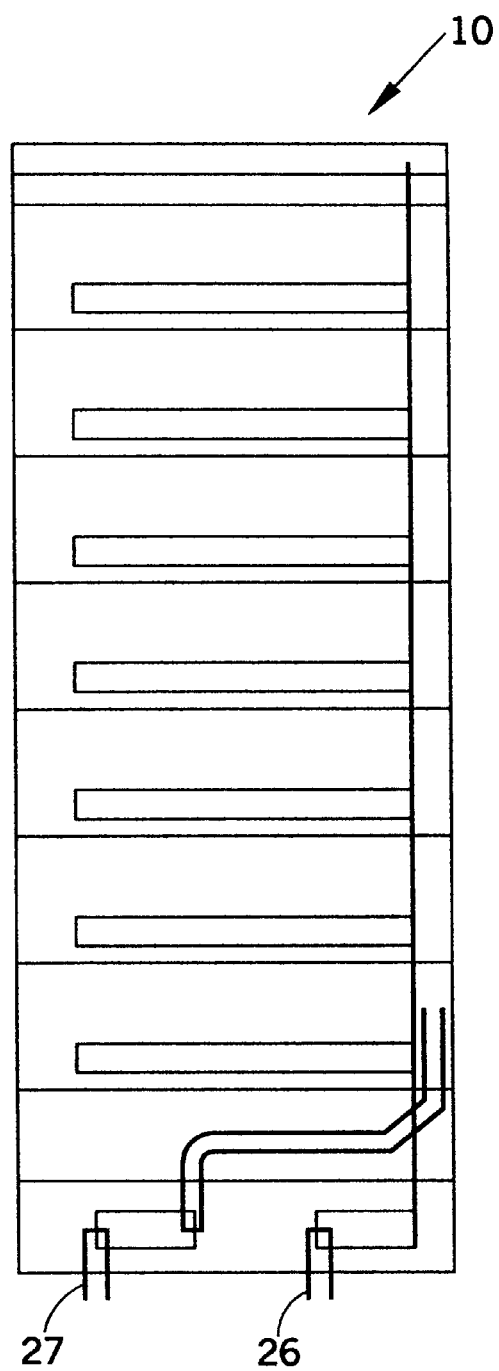
Figure 5A:
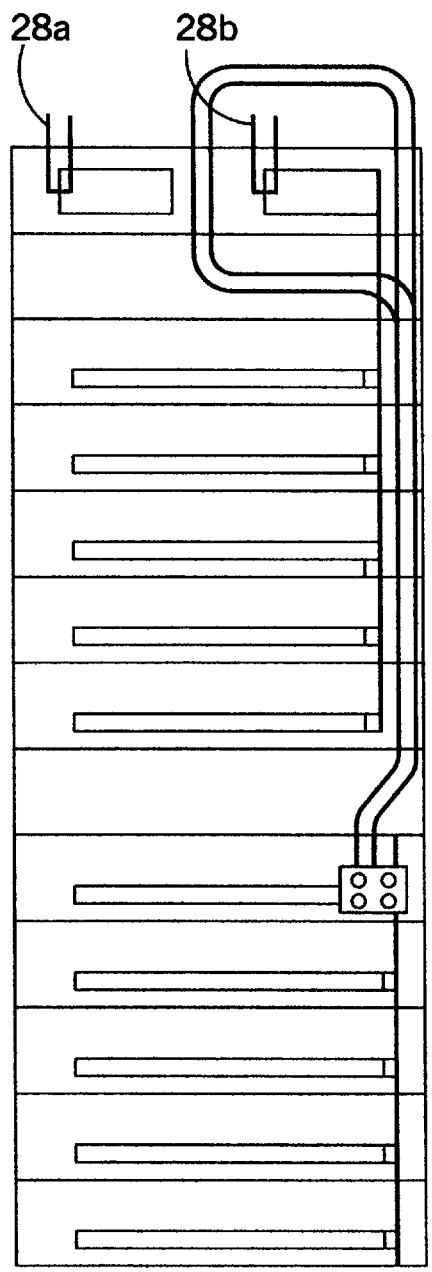
FIGS. 5a–5b are illustrations of dual top and bottom power feeds for power distribution cabinets.
Figure 5B:
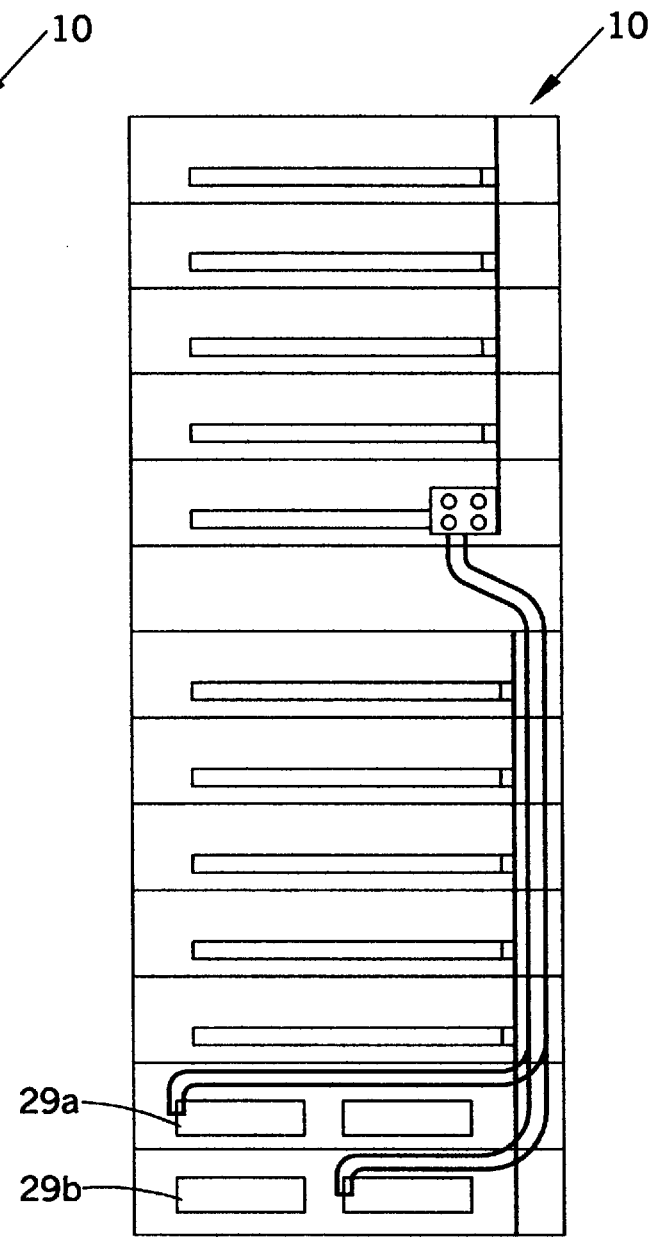

Referring now to the drawings wherein the showings are for purposes of illustrating the preferred embodiment of the invention only and not for purposes of limiting same, it is noted that FIGS. 1–5b have illustrated a type of existing distribution cabinet. Remaining FIGS. 6–20 illustrate a cabinet according to the teachings of a preferred embodiment of the present invention.

Figure 6:
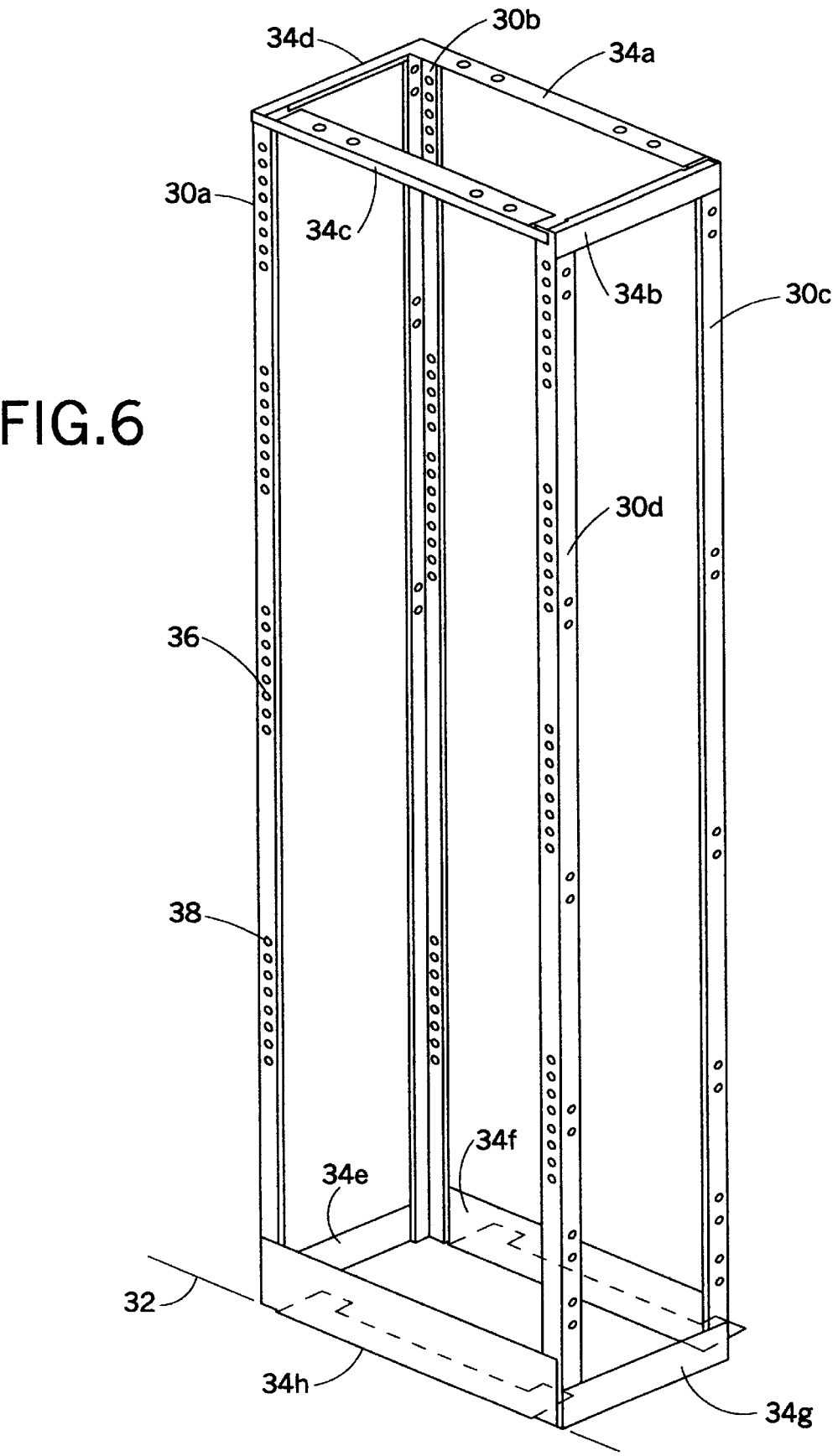
FIG. 6 is an illustration of the frame of the cabinet according to the subject invention.

FIG. 6 details the outer frame of a front and rear access cabinet according to the teachings of the present invention. FIG. 6 includes four corner supports 30a–30d which are in a vertical plane to floor area 32. The corner supports 30a–30d are interconnected via support rails 34a–34h. In the present embodiment the support rails interconnect with each other and the corner supports 30a–30d through the use of bolts, screws, clips, rivets, welding, molding or by other known connection means. In the present embodiment the interconnections form a generally rectangular frame, to which external cover panels are attached. The external cover panels include a back or rear cover panel, two side cover panels and front cover panels. The front, rear, and side cover panels allowing access to the front, rear and side portions of devices located within the cabinet.

Each of the corner supports 30a–30d and support rails 34a–34h have openings or through-holes which act as connection areas 36, 38 at selected locations along their respective lengths. These openings or through-holes 36, 38 are used in the further construction of the cabinet according to the present invention as connection locations between the corner supports, support rails and other elements of the cabinet as set forth below.

Support rails 34a–34h form the base and top of the cabinet and include flanges which allow the cabinet, if desired, to be attached to a floor surface such as a concrete floor or other support surface to allow for stabilization of the cabinet.

FIG. 7 is a top view of a mounting unit 40 of the present invention. Mounting unit 40 includes a back side portion 42 with angled end sections 44a–44b. Further included is a front portion 45 with right angled end sections 46a–46b. The front portion 45 includes a recessed area 48 set back from outer surface portion 50.

Figure 10:
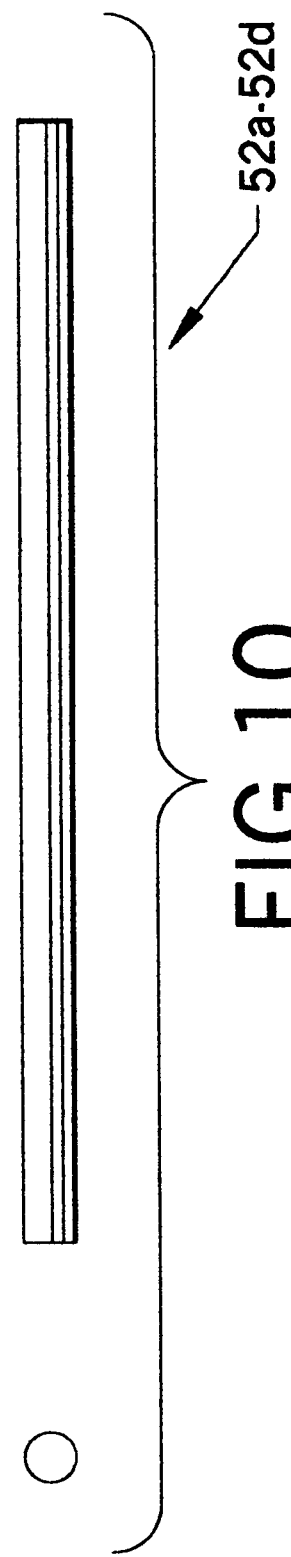
FIG. 10 are top and front views of the bars for the mounting units of FIG. 7.

Back portion 42 and front portion 45 are connected or joined together through bars or grooming bars 52a–52d, which are constructed in a rounded or tubular configuration as shown in FIG. 10. The ends of bars 52a–52d are joined to back portion 42 and front portion 45 by bolts, screws, welding, riveting or other attaching procedures. Through this interconnection a stable secure mounting unit 40 is formed where back portion 42 and front portion 45 are in a substantially parallel relationship to each other out to the respective angled end sections.

As illustrated in FIG. 8, front portion 45 of mounting unit 40 includes a plurality of openings or through-holes 54 and openings or attachment locations 56a–56d where bars 52a–52d are joined thereto, such as by welding. Through-holes or openings 54 are provided at spaced intervals for attachment of modules carried within the cabinet, as will be discussed below.

Figure 9:
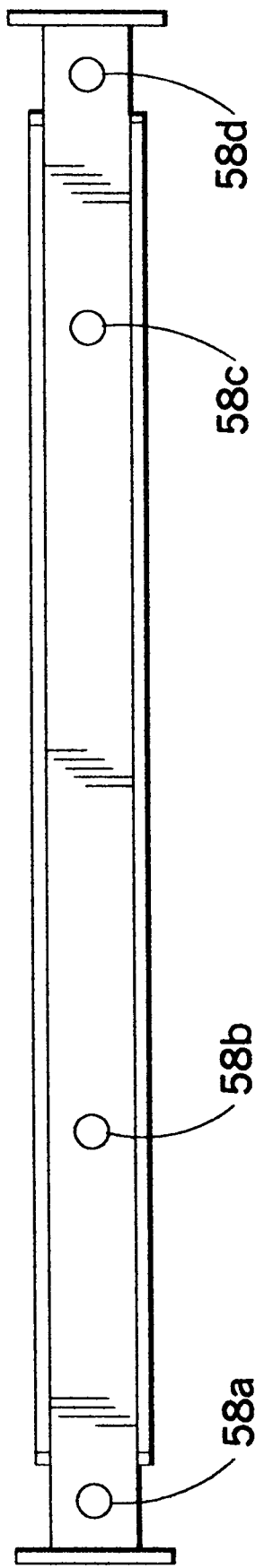
FIG. 9 is a front view of the back portion of the mounting unit of FIG. 7.

FIG. 9 provides a front view of back portion 42 of mounting unit 40. Openings or attachment points 58a–58d correspond to the locations where bars 52a–52d attach to back portion 42.

Returning attention to FIG. 7, each of angled end sections 44a, 44b, 46a and 46b include an opening for connection to an area on one of the corner supports 30a–30d.

Figure 11:
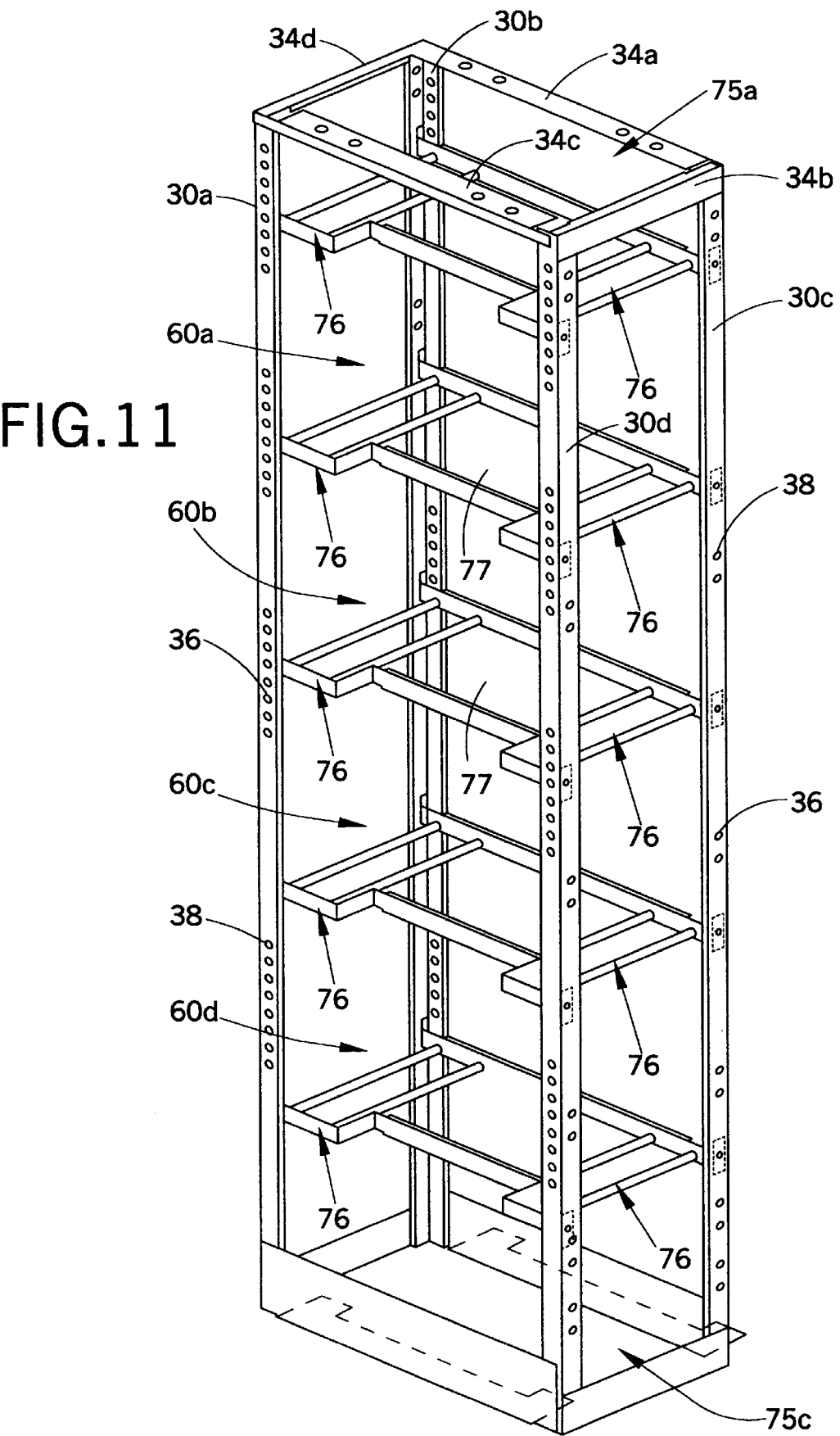
FIG. 11 illustrates the cabinet of the present invention with the mounting units located at desired intervals.

The connection of a number of mounting units 40 to the corner supports at angled end sections 44a, 44b, 46a and 46b is shown more particularly in FIG. 11. In FIG. 11, a number of mounting units 40 are connected to selected connection areas of corner supports 30a–30d such that there is a predetermined spacing between the mounting units. The spacing may be adjusted in accordance with the particular size module which is to be carried in the cabinet. In practice, the variations of spacing between the mounting units is a continuum limited only by the location of the connection areas 36, 38 of corner supports 30a–30d. It is to be appreciated that additional openings may be made in the corner supports thereby providing additional spacing choices.

Spaces 60a–60d provide locations where modularized electrical or electronic equipment may be inserted.

Figure 12:
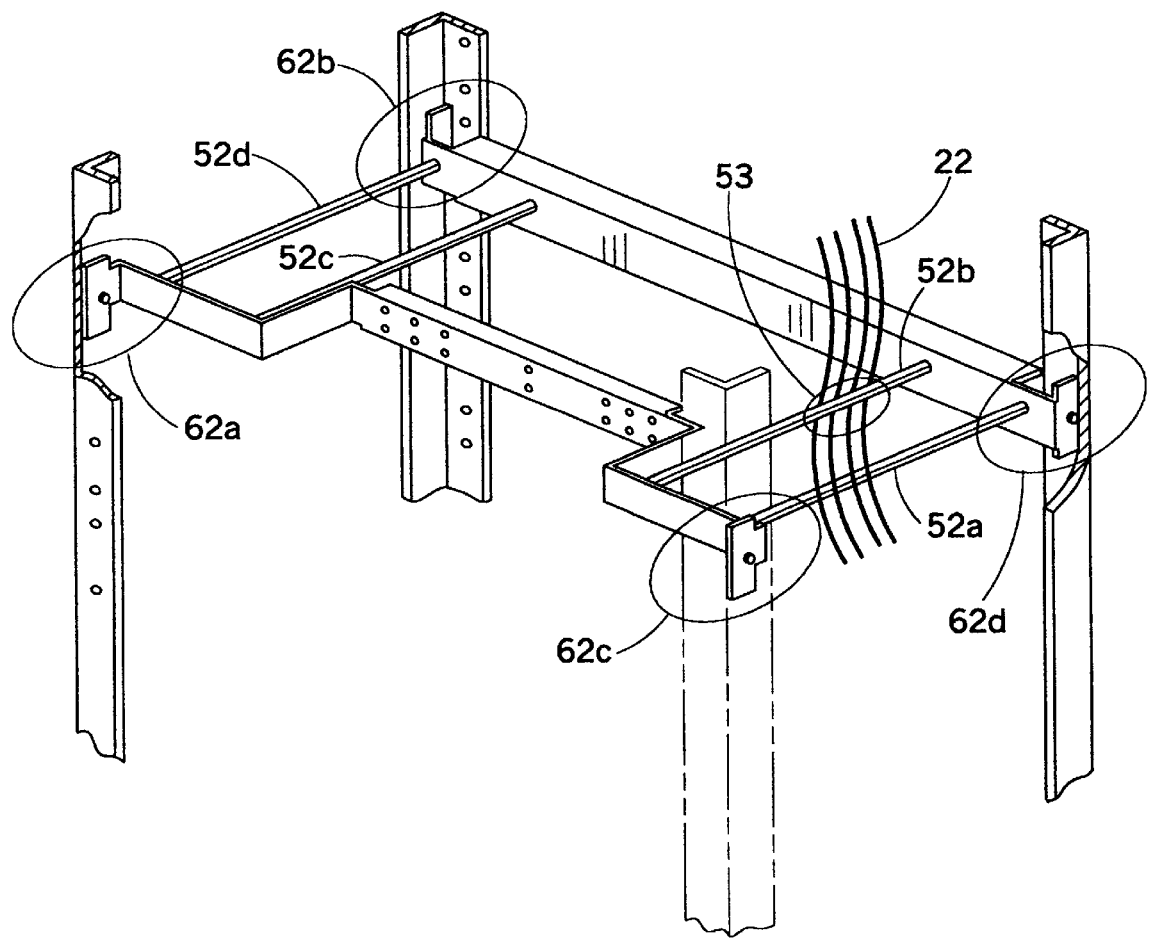
FIG. 12 illustrates a more detailed view of the interconnection between the frame and the mounting unit according to the present invention.

As can be seen more clearly in FIG. 12, by connecting angled end sections 44a, 44b, 46a and 46b to corner supports 30a–30d at areas 62a–62d, there is no need to connect any portion of mounting units 40 to a rear cover panel, front cover panel or side cover panels of the cabinet. This feature assists in front, rear and side access to the cabinet. It is noted that in construction of the mounting units 40, use of bars 52a–52d provides stabilization to the mounting units. The stabilization accomplished by use of bars 52a–52d includes structural stability for wires 22 and cabling 23 wherein as they are passed through the formation of a wiring passage formed by these bars the wires will not hit against the cabinet and will be segregated in a predefined area. Additionally, use of the corner supports 30a–30d provides for stability in the interconnection of the mounting units to the supports. While the present embodiment uses the end angled sections to connect to the corner supports it is to be appreciated other connection arrangements which do not connect to the front cover panel or back cover panel are possible.

Particularly, as one alternative end sections 44a, 44b, 46a, 46b do not need to be angled, but rather might be straight, rounded, etc. and are in this arrangement connected to corner supports 30a–30d. It is also noted that corner supports do not need to be in a V-shaped configuration but rather may be in other arrangements which provide sufficient stability and an area which allows attachment of the mounting units.

Figure 13:
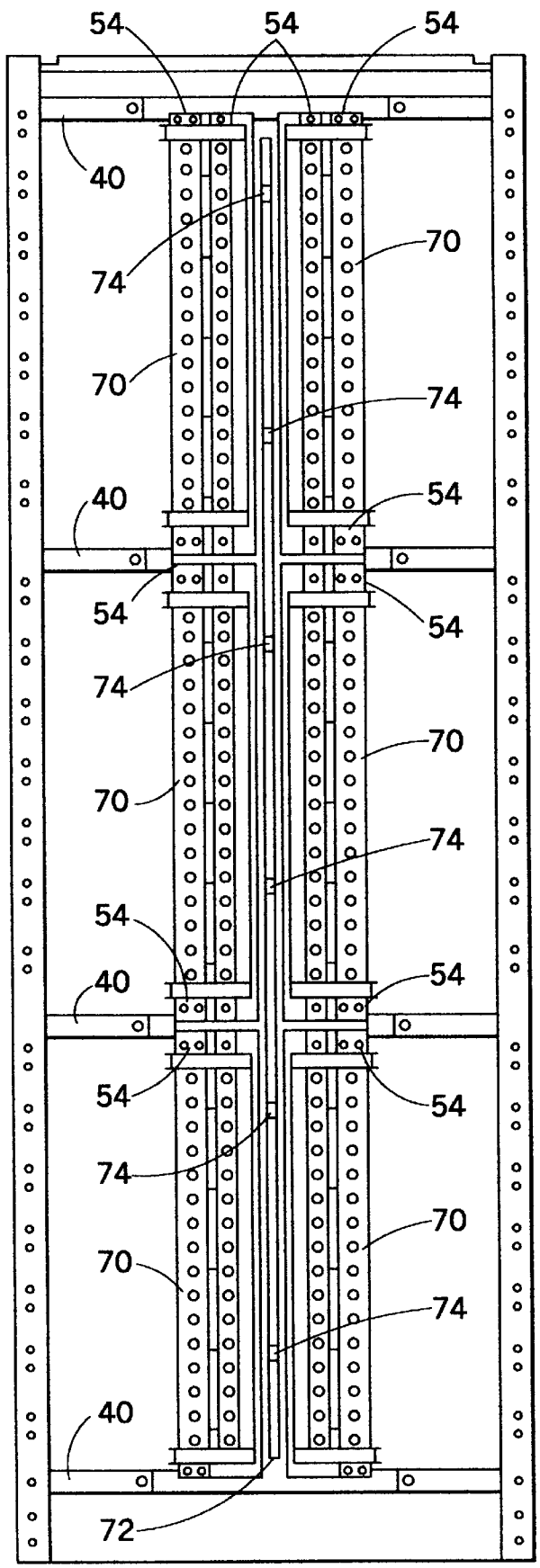
FIG. 13 illustrates the cabinet of the present invention including modules inserted therein.

It is noted that recessed portion 48 of each of mounting units 40 are aligned as shown in FIG. 11. Particularly, the front surfaces of the recessed portions are in the same plane. In this manner when, as illustrated in FIG. 13, modules 70 are inserted between the mounting units 40 and attached via openings 54 any part of the modules extending past the mounting unit results in the module being substantially even with front face 50. The modules inserted in the cabinet extend lengthwise into the cabinet interior. FIG. 13, also shows a monitoring bar 72, wherein each of the modules 70 are wired to an indicator 74, which in the present embodiment monitors and displays the current for each module.

The cabinet in FIG. 13 is completed by connection a back cover panel, side cover panels and front cover panels which allows access to the front of modules 70. It is noted that the modules inserted within the cabinet may be of varying heights and lengths, since the spacing between the mounting units is adjustable. It is also to be appreciated that while the modules discussed in the present embodiment are directed to monitoring and controlling power or current, it is possible for modules having other functions to be used, and modules having different functions may be included within the same cabinet. Modules which may be used in connection with the present invention, but not limited to such modules, are disclosed in U.S. application Ser. No. 08/717,482, entitled, Modular DC Distribution Unit and System, incorporated herein by reference.

Returning attention to FIG. 11, the cabinet according to the present invention is designed to allow either a top entry 75a or bottom entry 75b for power cables. Power cables are not shown but they may be entered into the cabinet in the same manner as known in the art and described in the previous discussion. In the present invention, the only interconnections necessary for an end user is a connection at the top or bottom of the cabinet for the power cables. It is not necessary for the end user to run the power cables throughout the cabinet. Particularly, as shown in the cabinet of the present embodiment, both top and bottom access areas are provided in a single cabinet, as shown in FIG. 11.

It is also noted, as illustrated in FIGS. 11 and more particularly FIG. 12 that bars 52a–52d, in sets of pairs 52a–52b and 52c–52d form wire passages 76. These wire passages provide for an organized passage through which wires 22 within the cabinet, going from module to module, may be passed without causing overlap or confusion. Bars 52a–52d and particularly bars 52b and 52c are used as tie points for ties 53 made to wires 22. Since round bars are used as the tie points, no insulation is needed when the connections are made. Therefore, the present invention provides for predefined passages 76 through which internal wiring between modules may be accomplished. These passages are integrated into mounting units 40 by the use of bars 52a–52d. By integrating bars 52a–52d into the mounting units 40, the tie bars are not integrated to the side panels as previously done. Therefore, ties of the wires are not made and connected to the side panels which allow for the panels to be removed and access made from a side location. Also, FIGS. 11 and 12 further illustrate that bars 52b and 52c form a cable passage 77 through which power cables pass and are segregated.

Figure 14:
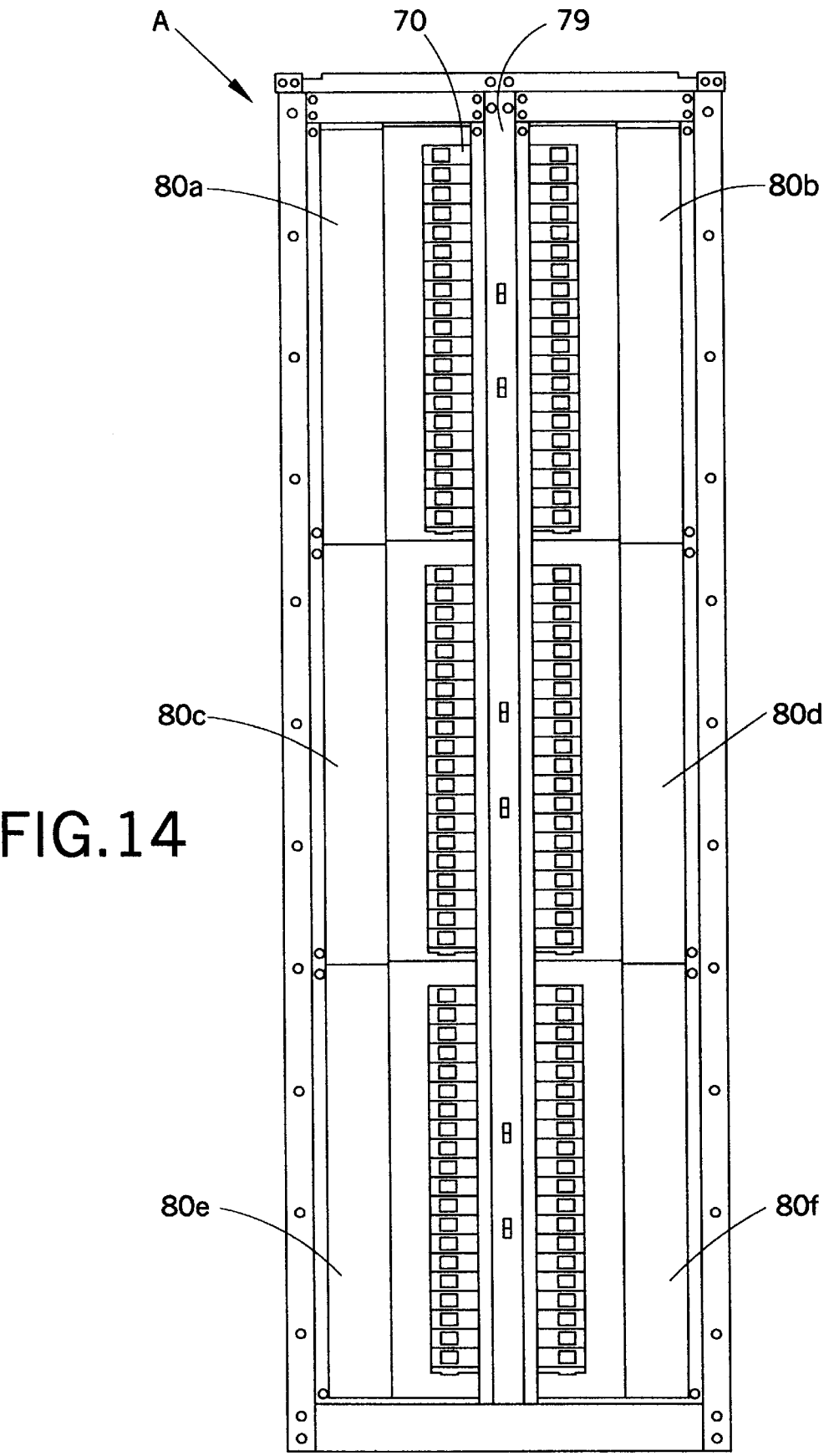
FIGS. 14 and 15 illustrate a front view of the cabinet according to the present invention.
Figure 15:
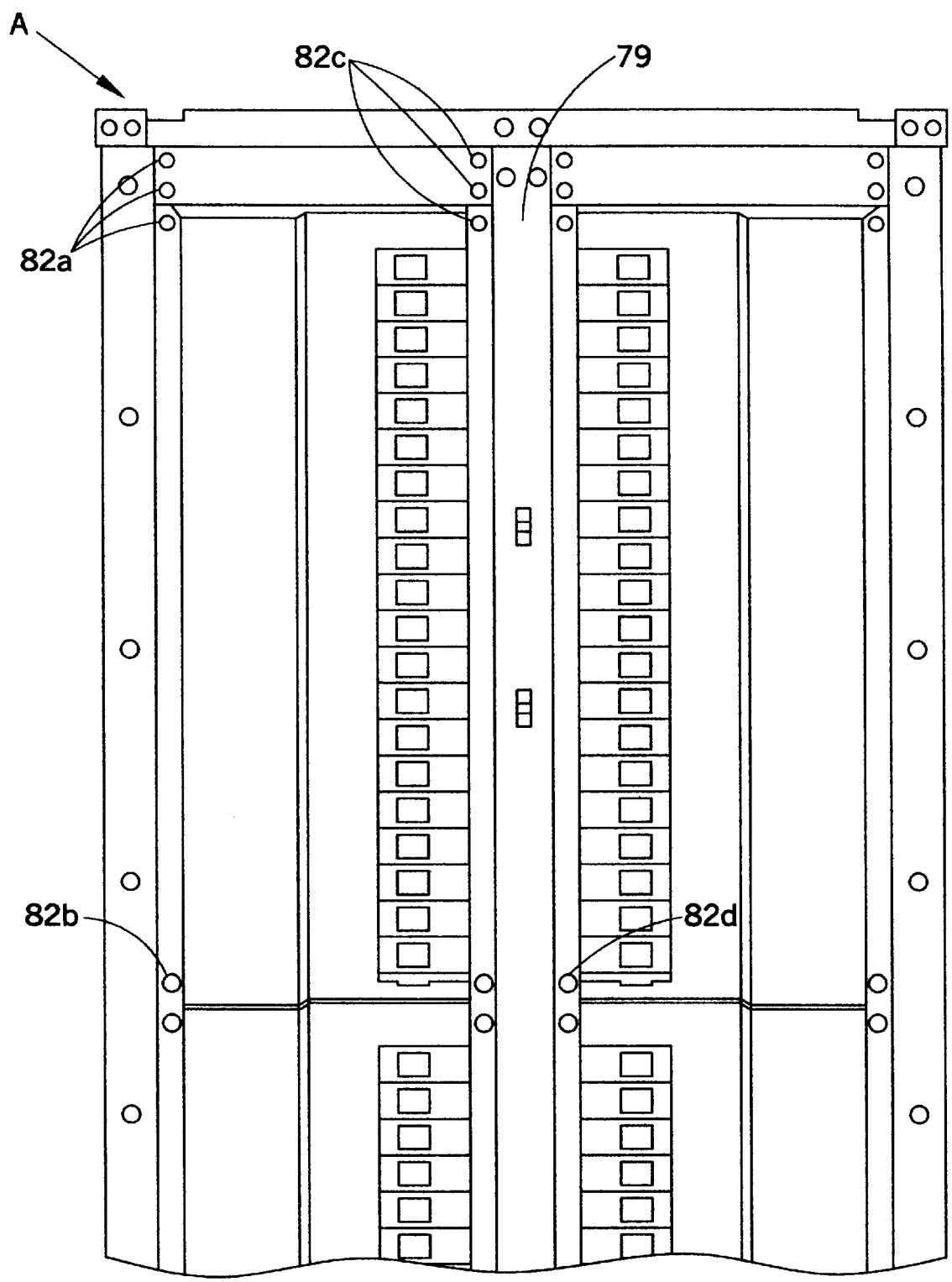

FIG. 14 illustrates the cabinet A of the present invention including modules inserted therein and front cover panels 80a–80f. These panels have openings which allow the user to the front of modules 70. It is to be appreciated that the front access being discussed in connection with access to the interior of the cabinet is different to the concept or accessing in accordance with normal operation of the modules. For example, if the modules are of circuit breakers or fuses, access in this manner allows the replacement or resetting of these devices. However, the present invention is further directed to the concept of removing one of front cover panels 80a–80f and accessing the interior of the cabinet therethrough. As more particularly shown in FIGS. 15 and 16, front cover panel 80a, for example, is connected to one of corner supports 30a–30d through screws or other connection devices 82a–82b. The other side of panel 80a is connected by connection devices 82c and 82d to a monitoring bar, or other middle divider or connection bar 79 which can be used therein. By removal of devices 80a–80d access through the front panel to the interior of the cabinet is obtained, for the reasons previously discussed. The cabinet A is enclosed by attaching side panels 81a and 81b and rear panel 83. It is noted that these panels 81, 83 have substantially flat interior wall surfaces 81a', 81b' and 83'. Particularly, there is no wire passages etc. integrated into the interior walls.

Figure 16:
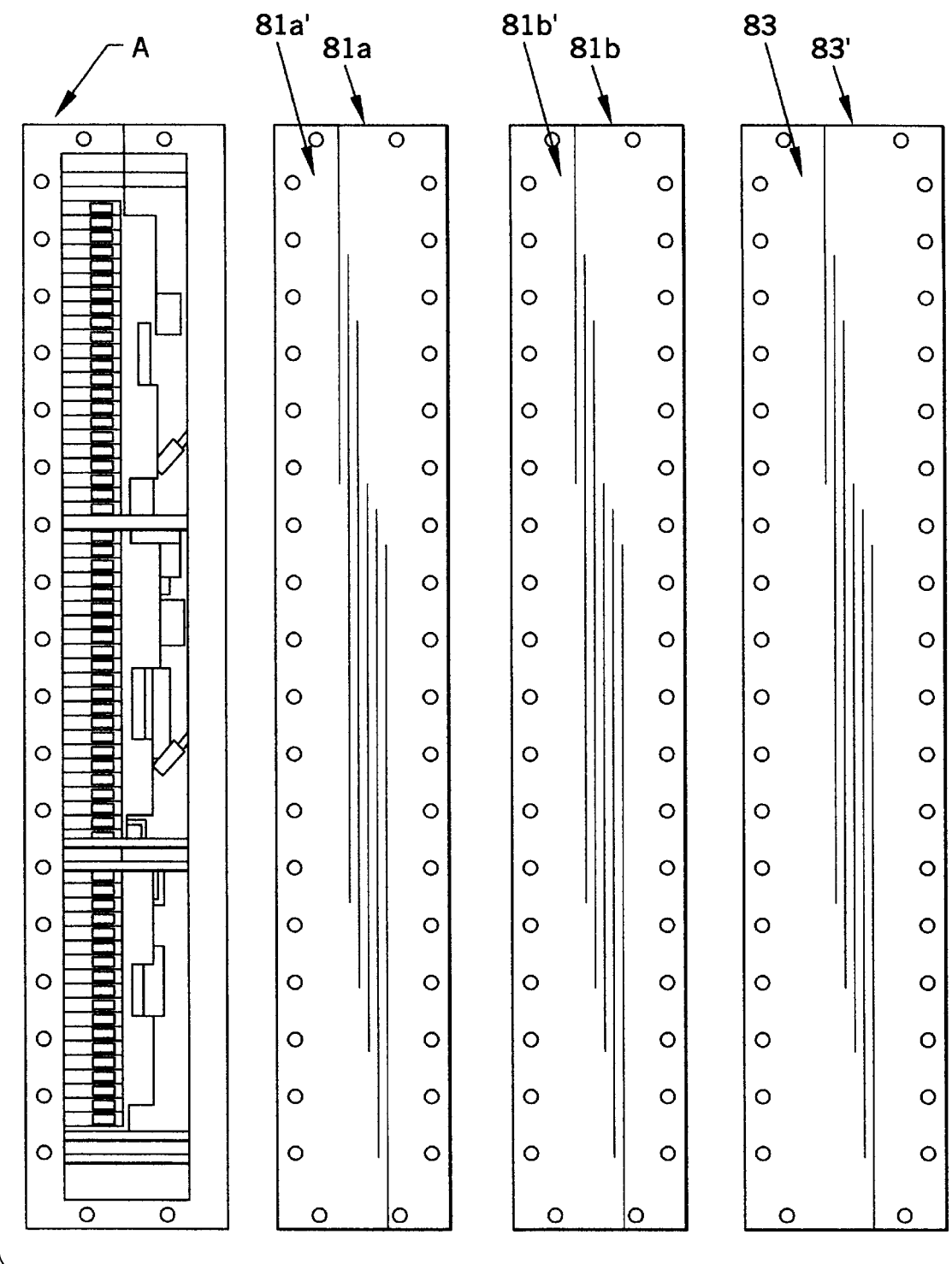
FIGS. 16 and 17 illustrate side views of a cabinet according to the teachings of the present invention, wherein fuse modules are inserted.
Figure 17:
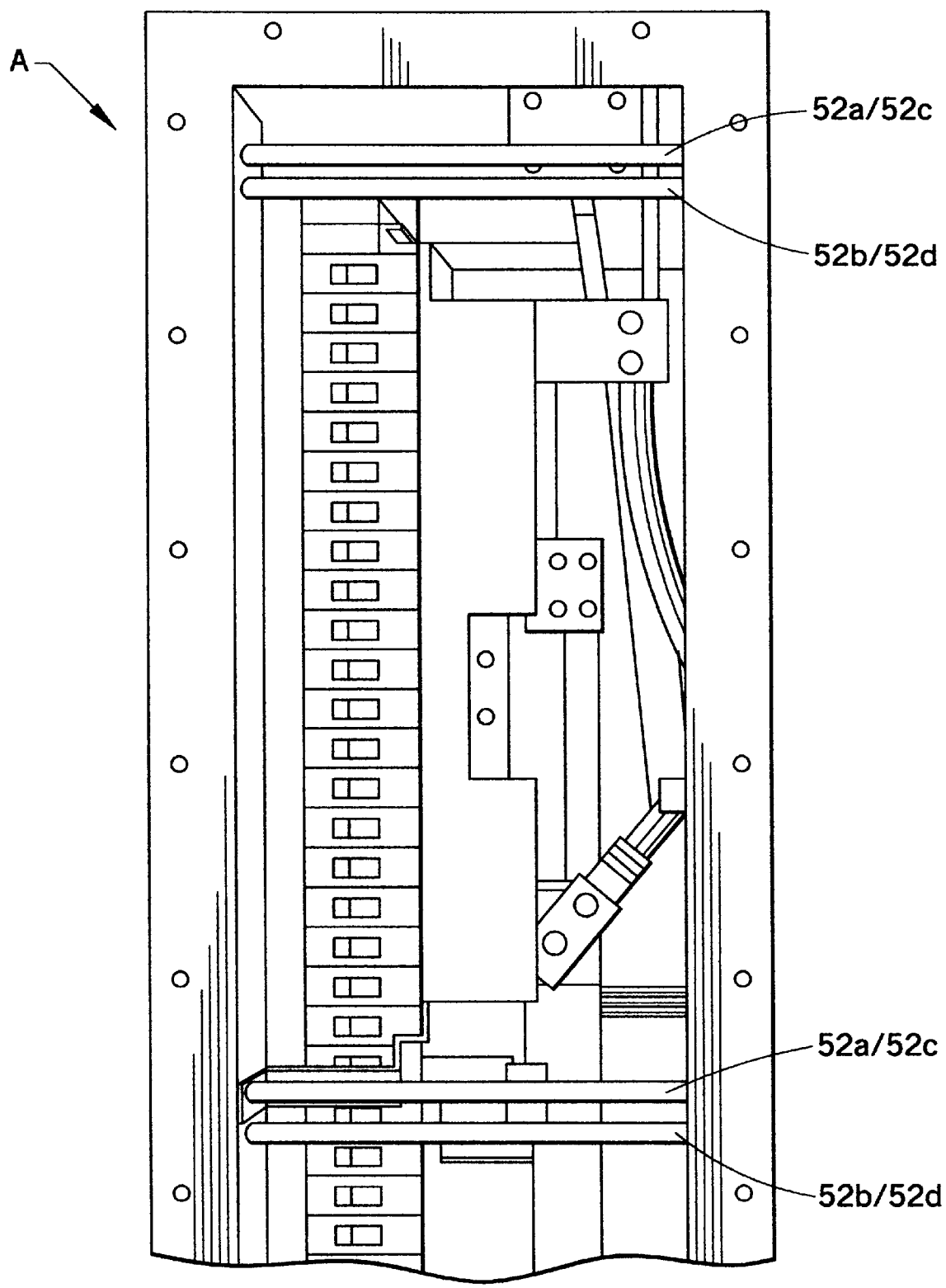

FIG. 16 is a side view of the cabinet A according to the present invention. Within cabinet A are a plurality of fuse modules. FIG. 17 shows a close up view of FIG. 16. As can be seen in this figure, a pair of one of bars 52a–52d define a passage through which output wiring will be passed. Also disclosed in this figure is the depth of the fuses of the fuse module included in cabinet A.

Figure 18:
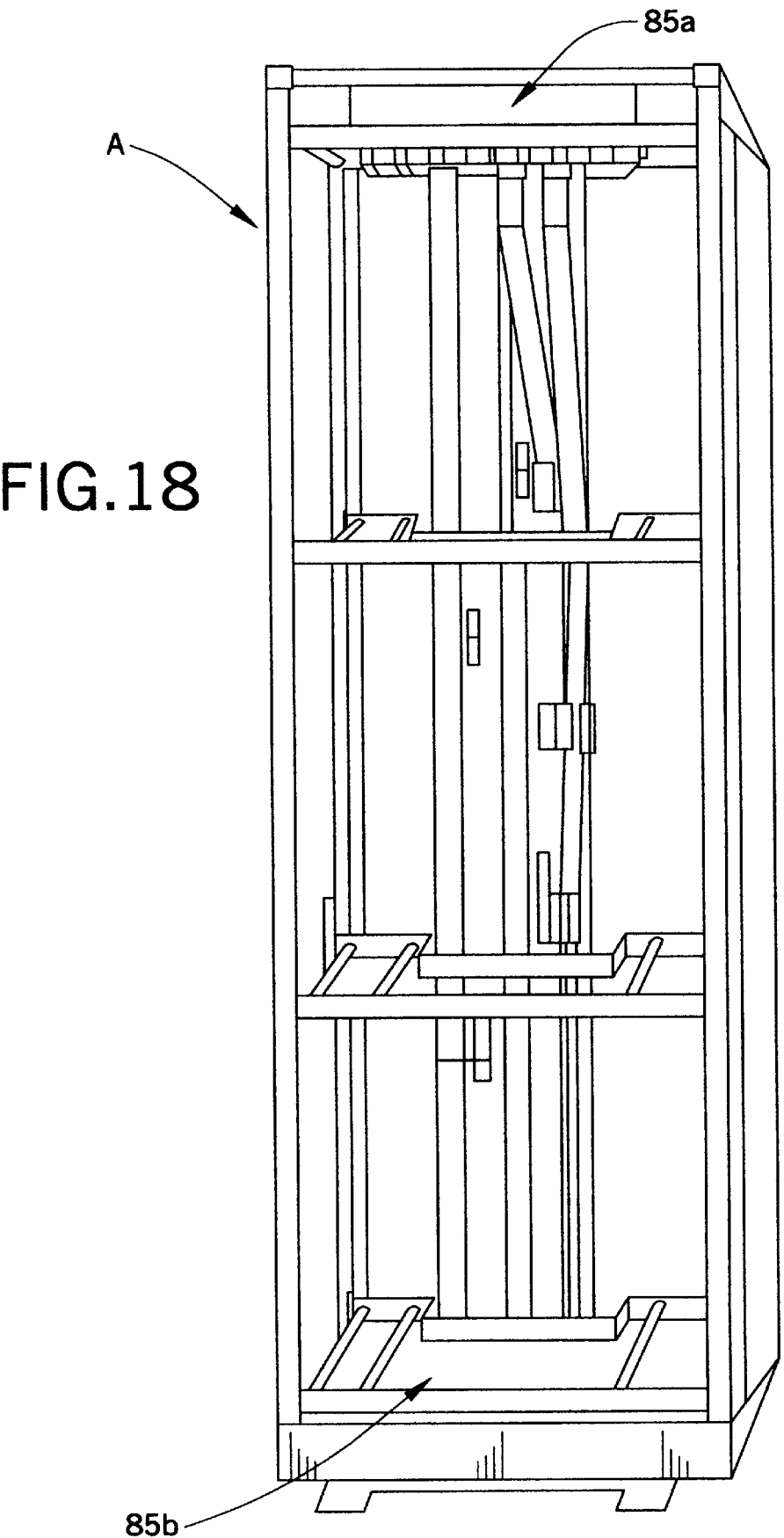
FIGS. 18 and 19 illustrate rear views of a cabinet according to the teachings of the present invention and the back cover panel is removed.
Figure 19:
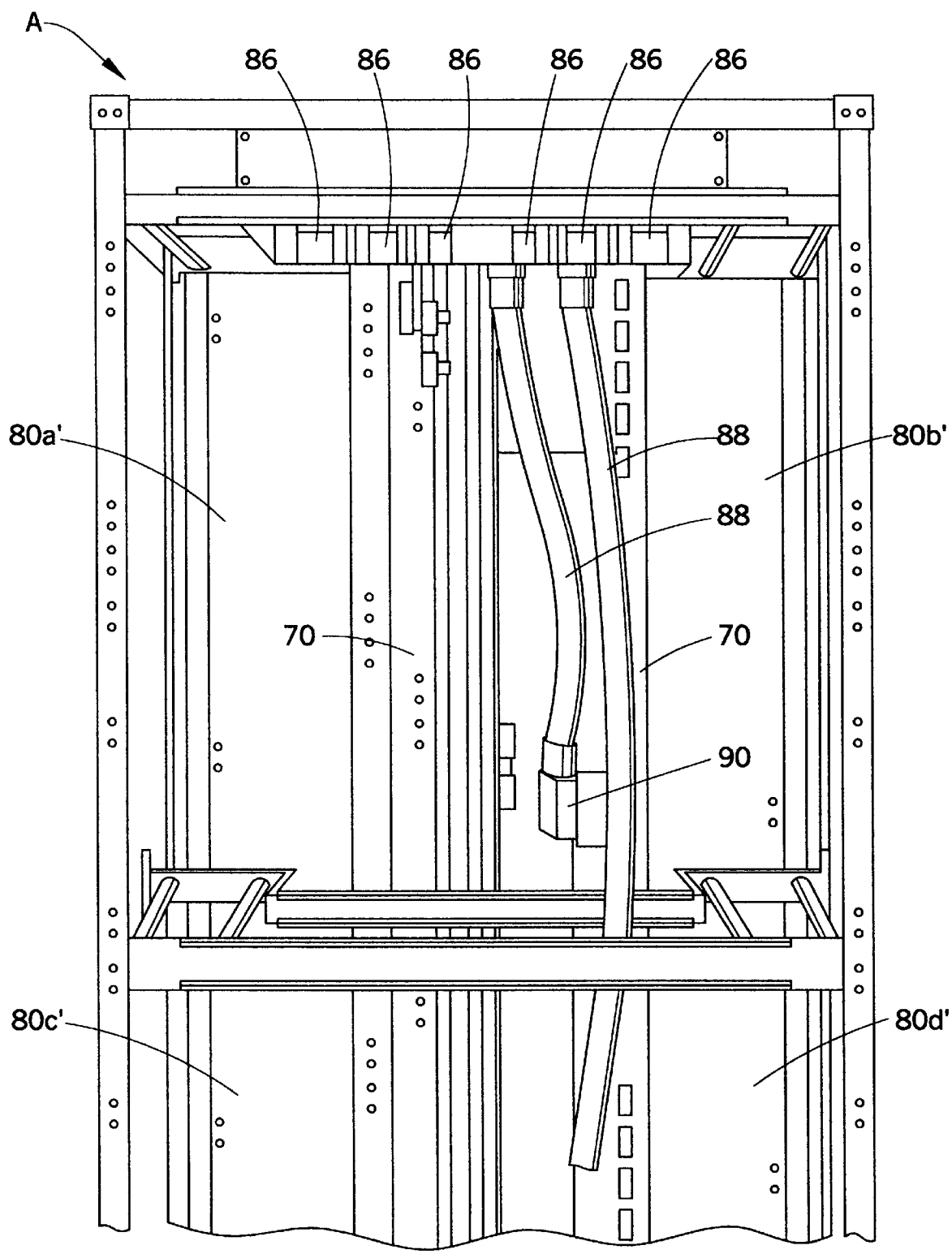

FIG. 18 is a rear view of cabinet A according to the present invention. This figure illustrates the internal pre-connections to distribution points within the cabinet. Such a construction allows an end user simply to interconnect at external terminals at either a top entry point 85a or a bottom entry point 85b. FIG. 19 is a close up view of FIG. 18. In this figure, the internally pre-connected cabling is illustrated, for example, top bus bar 86 connects to internal cabling 88 which in turn connects to a module connection point 90 for one of modules 70. Thus, when a front cover plate, for example, 80a is removed, and the associated screws or other connection devices holding module 70 to mounting units 40 are disconnected, there is sufficient space to allow a technician entry into the interior of cabinet A. Also, the flexibility of cables 90 allows a technician to pull out a module 70 and have access to the internal workings of the cabinet to make disconnections at the required locations. It is also shown in FIG. 19, that the interior wall surface of panels 80a–80d and the other front cover panels has a substantially flat surface 80a'–80d'.

By providing front, side and rear access to the interior of the cabinet, the cabinet has substantially 360° access capability for a technician to work on a particular module, while the remaining devices, modules in cabinet A are still powered. This capability is maintained even though bars 52a–52d are used in mounting unit 40. This is particularly true since bars 52a–52d are integrated into the mounting unit and not into the side cover panel or other locations in the cabinet.

It is to be appreciated that while the present embodiment is formed of a metal material, other structural material having sufficient strength and characteristics could be used. Particularly, a foam type molding could be used wherein the entire corner supports and supporting rails are formed as a single unit and the mounting units are formed as a single unit.

Figure 20:
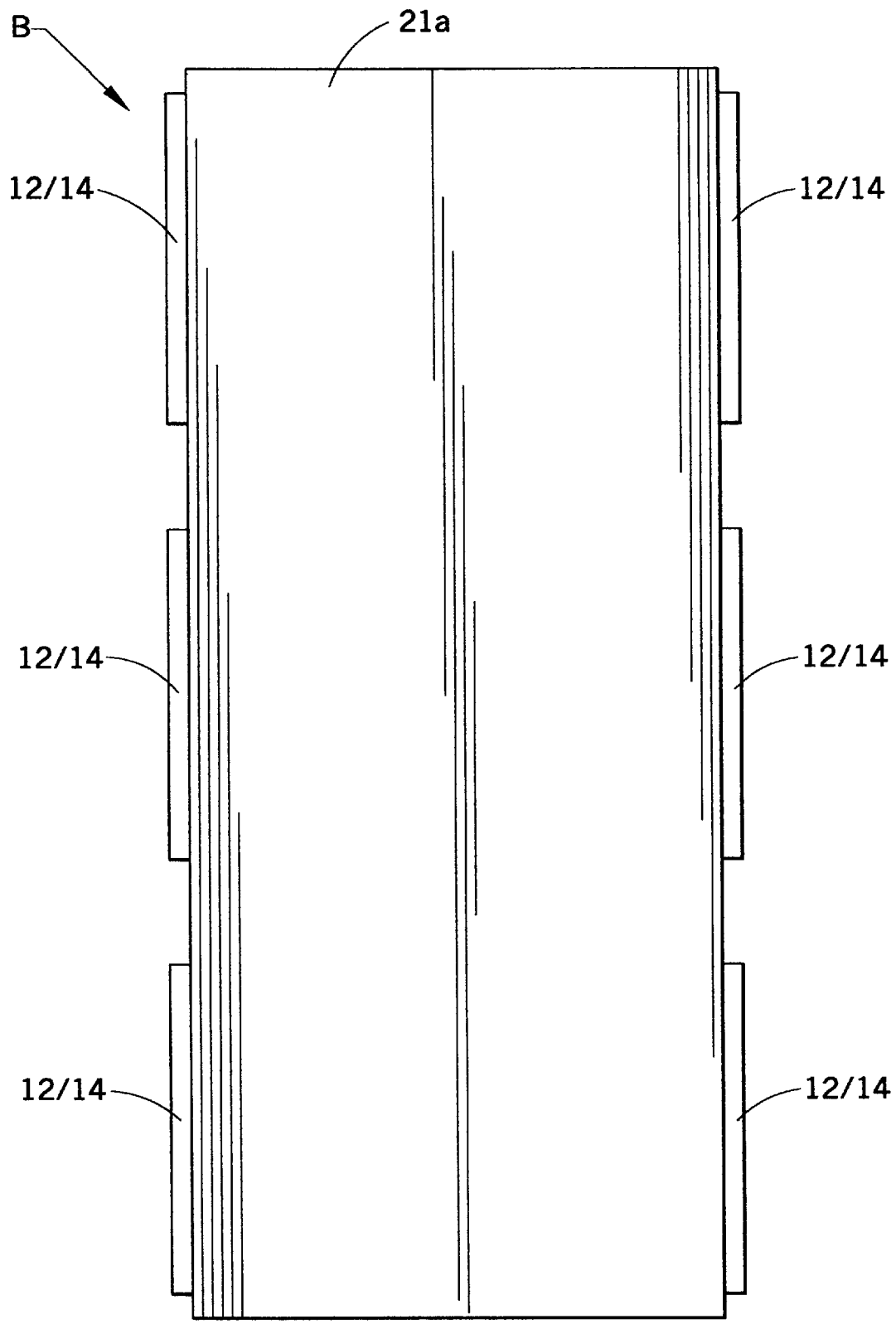
FIG. 20 illustrates a cabinet having modules on a front and rear face thereof.

By the present invention, it is possible to have two cabinets of the present invention in a back to back configuration. This is possible since rear access is not required for a cabinet according to the present teachings. Additionally, FIG. 20 illustrates that it is possible to put module units 12, 14 on both the front and rear face of the cabinet B as long as the depth of the cabinet is sufficient to allow for the running of the internal wires and cables. Particularly, since the internal cables are pre-connected, when a module needs to be replaced, serviced, etc. since the modules have front and side access capabilities this dual placement of modules is possible.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A multi-access communication power distribution cabinet for electronic/electric power termination devices, the cabinet comprising:

a plurality of corner supports arranged in a rectangular relationship to each other, each corner support having a plurality of connection areas;

a plurality of support rails interconnecting the corner supports to form a three dimensional rectangular frame;

a plurality of mounting units, each configured with a front portion and a back portion, the front portion and the back portion connected to each other through a plurality of wire/cable passage bars which are perpendicular to the front and back portions, the wire/cable passage bars arranged to form wire/cable passages and wire/cable tie areas, the mounting units also including four end sections located at ends of each of the front and back portions, the mounting units attached to the corner supports by connection of the four end sections at selected connection areas of the corner supports, the mounting units located from each other at pre-selected intervals in substantially parallel planes to each other;

a plurality of electronic/electric modules each having a front section, a rear section and a module connection section, the module connection section connected to a front portion of each of two mounting units located from each other at the pre-selected intervals;

a bus bar located at least at one of a top section or a bottom section of the cabinet;

a set of cables at least some of the set having first ends connected to the bus bar and second ends connected to rear sections of selected modules;

a pair of side cover panels each having an exterior side and an interior side, each one of the side cover panels connected to two different ones of the corner supports, wherein the interior side has a substantially flat surface and is facing the interior of the cabinet;

a rear cover panel having an exterior side and an interior side, the rear cover panel connected to two different ones of the corner supports, wherein the interior side has a substantially flat surface and is facing the interior of the cabinet; and a front cover panel assembly having a plurality of front cover panels, each of the front cover panels having a interior side and an exterior side and each panel connected to a front of the cabinet, the interiors of the front cover panels having substantially flat surfaces.

2. The cabinet according to claim 1 wherein the bars of the mounting units are rod shaped, with rounded edges.

3. The cabinet according to claim 2 wherein the bars are located in pairs, whereby each pair forms a wire/cable passage for the passing of wires and cables connecting to the modules.

4. The cabinet according to claim 3 wherein one of the bars from each of the pairs act together to form a cable passage area for the passing of cables from the power feed terminals to selected ones of the modules.

5. The cabinet according to claim 1 further including a connection post located between and parallel to the two corner supports forming the front side of the cabinet, and wherein the front cover panels are sized to be connected to one of the corner supports forming the front of the cabinet and to the connection post.

6. The cabinet according to claim 1 wherein more than one module is connected between two mounting units.

7. The cabinet according to claim 1 wherein the pre-selected intervals between the mounting units are alterable.

8. The cabinet according to claim 5 wherein the connection post includes a monitoring device for monitoring the status of the modules.

9. The cabinet according to claim 1 said plurality of mounting units attached to said corner supports are configured such that the modules are maintained in a powered state when one of the modules is being at least one of serviced, added to the cabinet and removed from the cabinet.

10. A multi-access distribution cabinet, the cabinet comprising:

four corner supports arranged in a rectangular relationship to each other, each corner support having a plurality of connection areas;

a plurality of support rails interconnecting the corner supports to form a three-dimensional rectangular frame;

a plurality of mounting units, each configured with four end sections, each one of the four end sections attached to a corresponding one of the four corner supports by connection of the four end sections at selected connection areas of each of the four corner supports, the mounting units positioned from each other at pre-selected intervals in substantially parallel planes to each other in a horizontal relationship to ground; and a cable/wire passage integrated into at least some of the plurality of mounting units.

11. The cabinet according to claim 10, wherein the mounting units are positioned on a first side and a second side of the three-dimensional frame.

12. The cabinet according to claim 10 wherein the pre-selected intervals are alterable.

13. The cabinet according to claim 10 wherein the modules are of varying sizes and have differing functional characteristics.

14. The cabinet according to claim 10 further including a set of power connectors to connect external power to the cabinet.

15. The cabinet according to claim 14 wherein the set of power connectors connect external power of different levels.

16. The cabinet according to claim 10 wherein the three-dimensional frame is formed as a single molded unit and wherein the mounting units are formed as single molded units.

17. The cabinet according to claim 10 further including a plurality of electronic/electric modules connected to sections of the mounting units.

18. A multi-access communication power distribution cabinet for power termination devices, the cabinet comprising:

a plurality of corner supports, each corner support having a plurality of connection areas;

a plurality of support rails interconnecting the corner supports to form a frame;

a plurality of mounting units, each configured with a front portion and a back portion, the front portion and the back portion connected to each other through a plurality of wire/cable passage bars perpendicular to the front and back portions, the wire/cable passage bars arranged to form a wire/cable passage, the mounting units also including end sections located at ends of each of the front and back portions, the mounting units attached to the corner supports by connection of the end sections at selected connection areas of the corner supports, the mounting units located from each other at pre-selected intervals;

a bus bar located at least at one of a top section or a bottom section of the cabinet;

a set of cables connected to the bus bar to supply power to the cabinet;

a pair of side cover panels connected to at least some of the corner supports defining a side of the cabinet;

a rear cover panel connected to at least some of the corner supports defining a rear of the cabinet; and a front cover panel connected to corner supports defining a front of the cabinet.

19. The cabinet according to claim 18 further including a plurality of device modules each having a front section, a rear section and a module connection section, the module connection section connected to front portions of each of two mounting units located from each other at the pre-selected intervals, and wherein the cables connected to the bus bar are further connected to selected ones of the device modules.

20. The cabinet according to claim 18 wherein the pair of side cover panels, rear cover panels, and front cover panel each having substantially flat interior surfaces.

* * * * *